US005590992A

United States Patent [19]
Russell

[11] Patent Number: 5,590,992
[45] Date of Patent: Jan. 7, 1997

[54] COVER FOR A BOLT AND NUT

[75] Inventor: Vincent T. Russell, Middleburg Heights, Ohio

[73] Assignee: Aluminum Company of America, Pittsburgh, Pa.

[21] Appl. No.: 423,421

[22] Filed: Apr. 18, 1995

Related U.S. Application Data

[63] Continuation-in-part of Ser. No. 401,731, Mar. 8, 1995.

[51] Int. Cl.$^6$ ........................................ F16B 37/08
[52] U.S. Cl. .................... 411/431; 411/374; 301/37.37
[58] Field of Search ........................ 411/373, 374, 411/377, 429–431; 301/37.37, 122.5

[56] References Cited

U.S. PATENT DOCUMENTS

| | | | |
|---|---|---|---|
| D. 350,524 | 9/1994 | Bias | D12/213 |
| 2,018,301 | 6/1935 | Ferry | 85/35 |
| 2,095,289 | 10/1937 | Rosenberg | 151/14 |
| 2,538,483 | 1/1951 | Summers | 411/374 |
| 3,135,558 | 6/1964 | Johnston, Jr. et al. | 301/37 |
| 3,241,427 | 3/1966 | Bosler | 411/374 X |
| 3,364,806 | 1/1968 | Chaivre | 85/35 |
| 3,548,704 | 12/1970 | Kutryk | 85/56 |
| 4,324,516 | 4/1982 | Sain et al. | 411/5 |
| 4,521,146 | 6/1985 | Wharton | 411/1 |
| 4,557,654 | 12/1985 | Masuda et al. | 411/431 |
| 4,659,273 | 4/1987 | Dudley | 411/373 |
| 4,764,070 | 8/1988 | Baltzell et al. | 411/430 |
| 4,775,272 | 10/1988 | Toth | 411/429 |
| 4,784,555 | 11/1988 | Cantrell | 411/431 |
| 4,824,305 | 4/1989 | McCauley | 411/431 |
| 4,887,950 | 12/1989 | Sakayori et al. | 411/431 X |
| 4,907,929 | 3/1990 | Johnston, Jr. | 411/377 X |
| 5,082,409 | 1/1992 | Bias | 411/431 |
| 5,163,797 | 11/1992 | Patti | 411/431 |
| 5,193,884 | 3/1993 | Sheu et al. | 301/37.37 |
| 5,380,070 | 1/1995 | FitzGerald | 301/37.37 |

*Primary Examiner*—Suzanne L. Dino
*Attorney, Agent, or Firm*—David J. Hill; Gary P. Topolosky

[57] ABSTRACT

A one-piece, reuseable cover is provided for an assembly of a threaded bolt and an associated annular nut, wherein a portion of the bolt extends through the nut. The cover includes a closed top end portion and a generally cylindrical sidewall extending from the closed top end portion so as to define a generally hollow cavity within the cover. Within the cavity of the cover is located an internally threaded portion, the threads of which are adapted to mate with the external threads on the bolt, so that the cover may be attached to the portion of the bolt that extends through its associated nut by threaded engagement therewith, when the cover is installed over the bolt and nut assembly.

16 Claims, 3 Drawing Sheets

COVER FOR A BOLT AND NUT

CROSS-REFERENCE TO RELATED APPLICATION

This application is a continuation-in-part of co-pending application Ser. No. 08/401,731, filed Mar. 8, 1995, entitled "Wheel Cover Assembly For a Vehicle Wheel", the disclosure of which is fully incorporated herein by reference.

FIELD OF THE INVENTION

This invention relates generally to covers for threaded bolts and their associated nuts, and more particularly, to a cover for a lug bolt and nut assembly that is used to mount a wheel to a vehicle. The invention is particularly useful as a cover for the lug bolts and nuts of automobiles, trucks, busses or the like.

DESCRIPTION OF THE PRIOR ART

Threaded bolts and associated nuts are commonly used to attach or fasten together various structures. They are typically used, for example, to attach a wheel to a vehicle. In ordinary usage, most land vehicles require removal of their wheels for repair, tire replacement and other maintenance services. This frequently requires that the nuts used to attach the wheel to the vehicle be removed from their associated bolts and reattached, sometimes in wet or dirty environments. Dirt and various other particles may become embedded in the threads of the bolts or nuts, and the introduction of moisture may lead to rust and corrosion. Such conditions may lead to binding of the nuts on the bolts, so that they cannot be removed, except with great difficulty. In addition, the exposed threads of the bolts used to attach the wheels to a vehicle are also subject to physical damage.

It is known that a nut that is utilized, in cooperation with a threaded bolt, to attach or fasten together various structures, or to secure a wheel to a vehicle, may include a cap portion that completely covers the bolt over which the nut is installed. Such capped nuts are typically comprised of multiple components which require production in a multi-step process. This increases the complexity and expense of their manufacture and also introduces a requirement that precise tolerances be maintained between these multiple components. Furthermore, since such capped nuts are used, in cooperation with a bolt, to attach or fasten together structural components, they must be capable of being tightened into place very securely, usually by use of a wrench or other tool. Unfortunately, the heavy wrench forces exerted on the polygonal faces of such capped nuts may weaken the engagement by which the various components of these nuts are held together, thereby causing such nuts to fail. Another possible result of the repeated forces exerted on such nuts by a wrench or other tool is that the outer cap portions may be damaged or broken, so that the covering and sealing characteristic of such nuts is lost. Even when such multi-piece capped nuts retain their integrity, the fit of their components may be such that moisture may enter between the nut body and the cap portion, and ultimately lead to corrosion of the bolt or stud.

Thus, for example, U.S. Pat. No. 2,018,301 of Ferry describes a two-piece dome-shaped cap nut which includes a nut portion which is covered and enclosed by a dome-shaped cap portion. The nut has a circumferential ledge around one face, and a peripheral rabbet on the other face that forms a second circumferential ledge spaced inwardly from the outside of the nut. The cap portion is in the form of a one-piece stamping, formed in a die and shaped to conform to the nut. The cap is formed with shoulders that seat upon the first ledge, and an inwardly turned flange that bears against the ledge of the rabbet on the other face.

U.S. Pat. No. 3,364,806 of Chaivre describes a two-piece decorative wheel nut formed by encasing a standard steel wheel nut in a sheath or cap formed of stainless sheet material drawn over the nut so as to cover the exposed surfaces thereof. The sheath of this decorative wheel nut extends to cover the planar sides of the nut which are engaged by a wrench to install the decorative nut assembly. However, the sheath does not extend below the planar sides into the conical or tapered region of the nut that engages against the wheel.

U.S. Pat. No. 4,764,070 of Baltzell et al. describes a two-piece capped wheel nut assembly comprised of a threaded nut and a cap that is adhesively attached to the nut. The end of the cap that engages the nut is also crimped over a circular enlargement near one end of the nut.

U.S. Pat. No. 4,775,272 of Toth describes a two-piece decorative capped wheel nut comprised of a threaded nut and a cap that is welded to the nut. The nut has a circumferential shoulder which separates the polygonal sides that are engaged by a wrench from the tapered portion which engages against the wheel of a vehicle. The open end of the cap fits down over the polygonal sides of the nut and abuts the shoulder, where the two pieces are welded together.

The two-piece capped nuts of Ferry, Chaivre, Baltzell and Toth are all relatively complex and therefore more expensive to manufacture than the present invention. In addition, they are all subject to the intrusion of moisture and dirt between the various pieces of the assembly, which intrusion may lead to corrosion of the bolts over which the capped nuts are installed. Furthermore, the integrity of the assembly of the two pieces of these capped nuts may be jeopardized by the application of wrench forces necessary to tighten such nuts onto the bolts, especially where it is necessary to remove and reattach the nuts to the bolts.

It is also known that separate caps or covers may be provided for the bolts and nuts which are commonly used to attach or fasten together various structures. Such caps may be applied, for example, to cover the lug bolts or studs, and their associated nuts, that are used to fasten a wheel to a vehicle. Caps of this type may protect the studs and nuts, as well as serve as ornamental accessories for the vehicle wheel. In addition, caps for covering the studs and nuts may serve to prevent tampering or unauthorized removal of the lug nuts.

U.S. Pat. No. 2,095,289 of Rosenberg describes a bolt cover or cap which includes at least one resiliently elastic prong or tab that extends inwardly from the base of the cap so as to engage the threads of a bolt at or near the location where the bolt protrudes through its associated nut. The cap is installed by pressing it down over the bolt until it seats on top of the nut, and then turning it to insure that the prong or prongs tightly engage the threads of the bolt. However, the cap of Rosenberg does not cover or enclose the nut. It merely sits atop it, and consequently, it may not be successful in preventing the intrusion of moisture to the threads of the bolt. Furthermore, the cap of Rosenberg may be subject to being dislodged by vibration.

U.S. Pat. No. 3,135,558 of Johnston et al. describes a multi-piece bolt cover assembly for a vehicle wheel. The assembly includes a cap for each lug bolt or stud, with a tube connecting each pair of adjacent caps. Each tube may be equipped internally with a spiral spring to help maintain the assembly in place on a wheel. Each cap is also provided with inward projections which may fit against the exposed threads of the bolt over which it is installed, or against the tapered side surfaces of the nut. The assembly of Johnston, therefore, includes a minimum of two pieces for each bolt and nut that is used to attach the wheel to the vehicle.

U.S. Pat. No. 3,548,704 of Kutryk describes a bolt and nut cover that includes a tubular main body portion which has an inner surface that is adapted to frictionally engage the circumference of a nut and an inner tubular projection having an inwardly projecting rib that is adapted to frictionally engage the exposed threads of the bolt. The Kutryk cover includes both one-piece and two-piece embodiments. The one-piece embodiment is molded of flexible plastic, while the two-piece embodiment may include an inner tubular projection of flexible plastic and an outer main body portion of a rigid material, such as stainless steel or anodized aluminum. Although the flexible, one-piece embodiment of the Kutryk cover may adequately cover a bolt and nut, it might not be suitable for use in covering the threaded studs and nuts that are used to attach a wheel to a vehicle. It would seem that in such application, the Kutryk cover would be subject to being dislodged by impact with rocks or other road hazards, or merely due to vibration. Furthermore, it might have a tendency to become brittle at low temperatures or to expand and contract with temperature changes, thereby losing its grip on the nut and bolt, and being dislodged therefrom.

U.S. Pat. No. 4,784,555 of Cantrell describes a two-piece protective and ornamental cover for bolts and nuts. This cover is comprised of a cup-shaped outer piece having an internal radial groove. Into the groove is fitted an O-ring, which frictionally engages against the side surfaces of a nut to hold the two-piece cover in place thereon. Like the one-piece embodiment of Kutryk, the two-piece cover of Cantrell may be dislodged by impact with rocks or other road hazards, or due to vibration.

U.S. Pat. No. 5,082,409 of Bias describes a two-piece cap for the studs and nuts that are used to attach a wheel to a vehicle. This assembly includes a shell with a closed end and a plurality of generally planar side surfaces extending downwardly therefrom, and a metal clip which is inserted into the cavity of the shell. The clip includes an annular ring and a plurality of spaced projections extending downwardly from the ring's perimeter. The cap assembly is adapted to fit over the stud and nut, with the stud extending through the ring of the clip and each of the projections of the clip engaging a side surface of the lug nut. The cover of Bias, like several of the others discussed herein, is designed to require no contact between any part of the cover and the bolt over which it is installed.

It is also known to provide caps for covering the studs and nuts that are used to mount a wheel to a vehicle to prevent tampering or unauthorized removal of the lug nuts, or to conceal a special locknut. Thus, for example, U.S. Pat. No. 4,324,516 of Sain et al. describes a two-piece lug nut attachment that includes a breakable shroud that is adapted to fit over and enclose the lug nut, and a threaded sleeve which fits within the outer end of the shroud. A breakaway nut is attached to the top of this sleeve in such fashion that the wall connecting the breakaway nut with the sleeve will fracture once the sleeve is threaded onto the stud and fastened down against the top of the lug nut. Thereafter, the lug nut cannot be removed from the stud without breaking the shroud. One disadvantage of this lug nut cap is that it requires the use of a special tool to attach it to the stud and nut. Another disadvantage is that the lug nut cap of Sain et al. cannot be reused.

A similar two-piece lug nut attachment is described in U.S. Pat. No. 4,521,146 of Wharton. This tamper-resistant cap includes a protective skirt that fits over the lug nut and a threaded retaining sleeve which fits within the outer end of the skirt. The sleeve includes a socket part into which a tool may be inserted to tighten the sleeve onto the lug bolt or stud. When the sleeve is fully threaded onto the stud, the socket part strips off the sleeve, and the lug nut cannot thereafter be removed from the stud without breaking the skirt. Like the lug nut attachment of Sain et al., the cap of Wharton requires the use of a special tool to attach the cap to the stud and nut. Furthermore, it cannot be reused.

Another two-piece tamper-resistant lug nut attachment is described in U.S. Pat. No. 4,659,273 of Dudley. The cap assembly of Dudley includes a frangible shroud that is adapted to fit over the lug nut, and an internally threaded sleeve that fits within the shroud. The sleeve includes a pair of split sections integrally formed with a common end plate, and the end plate has a hole through which the stud may pass. Adjacent to the end plate, each section is internally threaded in an interrupted fashion that essentially corresponds to the thread of the stud to which it is to be affixed. The remainder of each section provides one-half of a hexagonal cavity having the approximate size and shape of a lug nut. The shroud is provided with three resilient internal appendages that retain the threaded sleeve therein, and the appendages are adapted to cam the sections of the sleeve apart as the sleeve is inserted into the shroud. To affix the assembly over a stud and nut, the shroud is positioned over the stud and nut and the end plate of the sleeve is inserted into the shroud. The sleeve is then axially pushed into the shroud, and the internal appendages spread the sleeve sections apart so that the sleeve will fit over the stud and nut, with the threaded portion engaging the threads of the stud and the remaining portion enclosing the nut. Although the cap assembly of Dudley is adapted for attachment to a stud and nut without the use of a special tool, its shroud must be broken to remove it. Therefore, like the caps of Sain et al. and Wharton, the cap of Dudley cannot be reused.

U.S. Pat. No. 4,824,305 of McCauley describes a two-piece decorative and protective cap for concealing and protecting a locknut which is of a type that requires a special key for removal. Such locknuts are sometimes mounted on one of the studs that are used to attach a wheel to a vehicle. The locknut with which the assembly of McCauley is designed to cooperate includes an axially extending curvilinear recess at its outer end, into which a key may be inserted for removal. The assembly includes an inner piece and an outer shell. One end of the inner piece is cylindrical and has internal threads, and the other end is hexagonal. The cylindrical portion is adapted to fit within the recess of the locknut when it is threaded onto the stud. The hexagonal end of the inner piece extends axially outwardly from the end of the locknut, and has a plurality of square lugs on its outer surface. The square lugs are adapted to mate with corresponding depressions in the outer shell of the assembly, when the outer shell is installed over the inner piece.

The caps for studs and nuts that have been discussed herein are, with one exception, multi-piece caps which involve a complex interrelationship of components that are more costly to fabricate than the invention described herein. In addition, several of the known caps, including the one-piece cap of Kutryk, do not offer a means of engagement that can resist vibration, or the impact of rocks or other hazards, or variations in temperatures encountered in ordinary use. Furthermore, as has been previously mentioned, several of the known caps for studs and nuts may only be used once. They may not be removed and used again.

Therefore, as can be seen from the foregoing discussion, although several types of decorative nuts and caps for studs and nuts have been developed, all are subject to various limitations and disadvantages.

OBJECTS AND ADVANTAGES OF THE INVENTION

Accordingly, it is an object of the invention claimed herein to provide a one-piece protective and ornamental cover for bolts and nuts that are used to attach or fasten together various structures. It is another object of the invention to provide such a cover for the studs and nuts which are used to attach a wheel to a vehicle.

It is still another object of the invention to provide such a cover, while avoiding the disadvantages and limitations of previously-known devices which require multiple components in a complex interrelationship. It is yet another object of this invention to provide such a cover that is simple and relatively inexpensive to manufacture.

It is still another object of this invention to provide a cover for an assembly of a threaded bolt and its associated nut that may be attached to the assembly without the use of tools. It is another object of this invention to provide a reuseable bolt and nut cover that may be installed over a bolt and nut, subsequently removed therefrom without damage and reinstalled for further use.

It is another object of this invention to provide a one-piece cover for a lug bolt and nut that can completely cover and enclose the nut and the portion of the lug bolt that projects therethrough. It is yet another object of this invention to provide such a cover that when installed will help to prevent the introduction of dirt and moisture to the lug bolt and nut and thereby prevent corrosion of such components.

It is still another object of this invention to provide such a cover for an assembly of a bolt and nut that can resist damage from impacts from rocks and other hazards. It is another object of this invention to provide a cover for an assembly of a bolt and nut that can be attached to the portion of the bolt that extends through the nut by threaded engagement therewith, and which will resist being dislodged from such an assembly due to vibration.

Additional objects and advantages of this invention will become apparent from an examination of the drawings and the ensuing description.

SUMMARY OF THE INVENTION

A one-piece, reuseable cover is disclosed for an assembly of a threaded bolt and an associated annular nut, wherein a portion of the bolt extends through the nut. The cover includes a closed top end portion and a generally cylindrical sidewall extending from the closed top end portion so as to define a generally hollow cavity within the cover. Within the cavity of the cover is located an internally threaded portion, the threads of which are adapted to mate with the external threads on the bolt, so that the cover may be attached to the portion of the bolt that extends through its associated nut by threaded engagement therewith, when the cover is installed over the bolt and nut assembly.

In order to facilitate an understanding of the invention, several embodiments of the invention are illustrated in the drawings, and a detailed description of the preferred embodiments follows. It is not intended, however, that the invention be limited to the particular embodiments described or to use in connection with the apparatus shown. Various changes are contemplated such as would ordinarily occur to one skilled in the art to which the invention relates.

BRIEF DESCRIPTION OF THE DRAWINGS

FIG. 4 shows the cover installed over a bolt and nut.

DESCRIPTION OF THE PREFERRED EMBODIMENTS OF THE INVENTION

Figure 1:
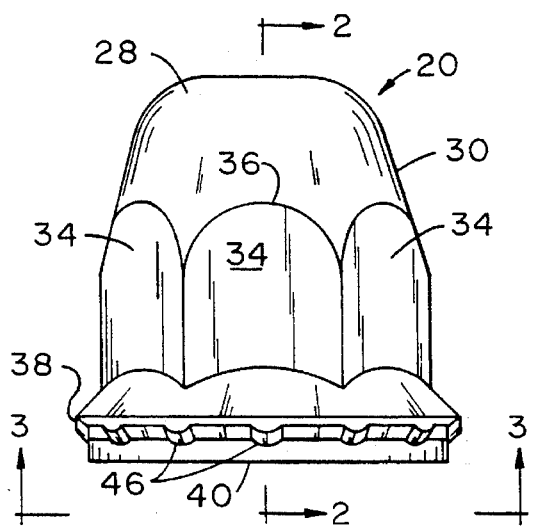
FIG. 1 is a side view of a preferred embodiment of the invention.
Figure 2:
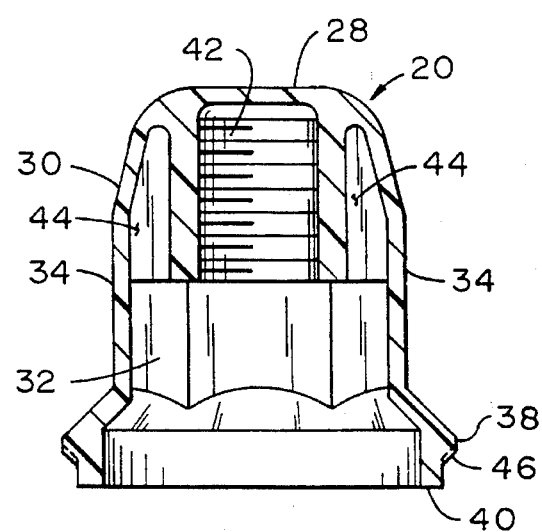
FIG. 2 is a sectional view of the cover of FIG. 1, taken along lines 2—2.
Figure 3:
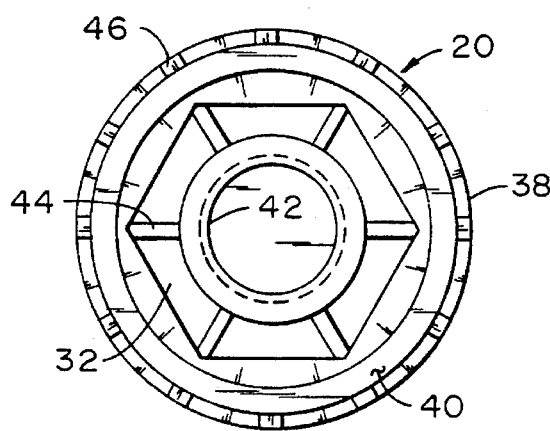
FIG. 3 is a bottom view of the cover of FIG. 1, taken along lines 3—3.
Figure 4:
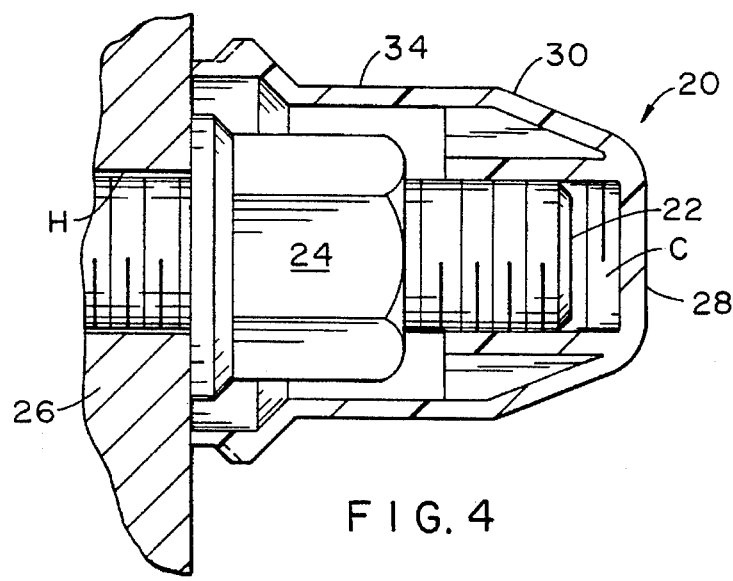
FIG. 4 is a sectional view of the cover of FIG. 1, similar to that of FIG. 2. However.

FIGS. 1 through 4 illustrate a preferred embodiment of the invention. As shown therein, cover 20 is configured to cover and enclose an assembly of a threaded bolt 22 and and associated nut 24 (FIG. 4). Cover 20 is particularly adapted to cover the bolts or studs and associated nuts that are commonly used to attach a wheel to a vehicle. A portion 26 of such a wheel is shown in FIG. 4. Cover 20 is configured to protect lug bolts and nuts against dirt, corrosion and damage from rocks and other hazards. It also serves a decorative or ornamental purpose. It should be understood, however, that the invention is not limited to use in connection with such bolts and nuts, or to use in connection with the attachment of wheels to a vehicle. The invention may be used on any threaded bolt and associated nut assembly.

The cover may be formed of any suitable material. Preferred results may be obtained from use of an acrylonitrile butadiene styrene (ABS) resin. This material can be injection molded into the configuration illustrated, and if desired, the outer surface of the plastic cover may be electroplated by any well-known (or subsequently developed) technique. With such plating, the aesthetics of the protective cover can be enhanced, while rendering the cover more resistant to dents and chips. Furthermore, a chrome-plated plastic cover is easily cleaned and polished to a fine luster.

As shown in FIGS. 1 through 4, cover 20 is comprised of a closed top end portion 28 and a generally cylindrical sidewall 30 extending downwardly therefrom so as to define a generally hollow cavity 32 within the cover. Preferably, sidewall 30 includes a plurality of exterior planar surfaces 34, which cooperate with end portion 28 to form a plurality of arches 36. In the alternative, sidewall 30 may be configured in any convenient shape, such as bell- or bullet-shaped, so long as it is generally cylindrical. Depending from the bottom of and around the periphery of sidewall 30 is terminal collar 38, which is adapted to seat on at least a portion of a flange in a hub cap, as described in co-pending application Ser. No. 08/401,731, filed Mar. 8, 1995, when the cover is used in the wheel cover assembly of that application. In a preferred embodiment of this invention, annular base 40 extends downwardly from sidewall 30 below collar 38 so that at least a portion thereof will be seated near or substantially flush against a relatively flat surface of wheel 26 when the cover is installed over bolt 22 and nut 24.

Cover 20 is configured for attachment by threaded engagement to the portion of a bolt that extends through its associated nut. As shown in FIGS. 2 and 4, cover 20 is provided with an internally threaded portion 42, which extends inwardly from an inner surface of top end portion 28 and is adapted to mate with the external threads on bolt 22. When cover 20 is installed over bolt 22 and nut 24, as shown in FIG. 4, it will preferably substantially cover the bolt and nut and minimize any exposure of the hole H in the wheel through which bolt 22 passes. Furthermore, as shown in FIG. 4, cover 20 is sized to fit over the bolt and nut with sufficient space or clearance to rotate thereabout as it is threaded onto bolt 22.

Cover 20 may be easily installed by hand over bolt 22 and nut 24 without the use of tools. It may also be hand tightened, or tightened with a wrench, so that at least a portion of base 40 seats near or substantially flush against a relatively flat surface of wheel 26. Note, however, that when cover 20 is installed over bolt 22 and nut 24 as shown in FIG. 4, there is preferably at least some clearance C between the top of bolt 22 and the inside of top end portion 28 within internal threads 42. In the embodiment illustrated in FIG. 4, internally threaded portion 42 is sized so that base 40 will seat on a relatively flat surface of wheel 26 as cover 20 is threaded onto bolt 22 before the internally threaded portion abuts against the upper or outer surface of nut 24. Of course, in certain applications, it might be desirable that the threaded portion abut the upper or outer surface of the nut before the base of the cover abuts a wheel or other surface through which the bolt extends. The cover could also be configured so that the threaded portion abuts the upper or outer surface of the nut at the same time that the base contacts the surface through which the bolt extends.

In forming cover 20, it is preferable to provide a plurality of internal stiffening ribs 44 for added strength and stability. As shown in FIG. 3, cover 20 preferably includes six such ribs 44, or one at each intersection of adjacent planar surfaces 34 (FIG. 1), although any convenient number and placement of such ribs could be utilized.

In the embodiment illustrated by FIGS. 1 through 4, terminal collar 38 of cover 20 is provided with a plurality of detents 46, which are adapted to cooperate with the flange in a hub cap, as described in co-pending application Ser. No. 08/401,731, when the cover is used in the wheel cover assembly of the aforementioned application. Alternatively, said collar could be provided with a series of indentations that are configured to cooperate with a hub cap flange having a plurality of detents therein, as is also described in the aforementioned co-pending application.

Figure 5:
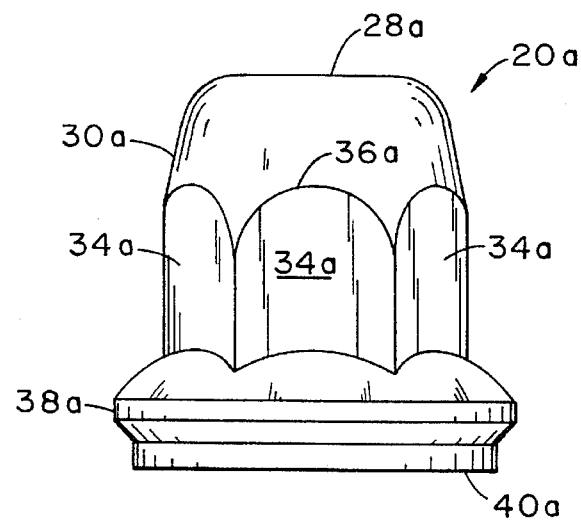
FIG. 5 is a side view of a first alternative embodiment of the invention.

A first alternative embodiment of the invention, cover 20a, illustrated in FIG. 5, is quite similar to cover 20, except that it lacks the detents mentioned above. Cover 20a is comprised of closed top end portion 28a and generally cylindrical sidewall 30a extending downwardly therefrom so as to define a generally hollow cavity (not shown) within the cover. Preferably, sidewall 30a includes a plurality of exterior planar surfaces 34a, which cooperate with end portion 28a to form a plurality of arches 36a. Depending from the bottom of and around the periphery of sidewall 30a is terminal collar 38a, which is adapted to seat on at least a portion of a flange in a hub cap, as described in co-pending application Ser. No. 08/401,731, when the cover is used in the wheel cover assembly of the aforementioned application. In a preferred embodiment of this invention, annular base 40a extends downwardly from sidewall 30a below collar 38a so that at least a portion thereof will be seated near or substantially flush against a relatively flat surface of a wheel or other surface through which the bolt protrudes when the cover is installed over a bolt and nut.

Figure 6:
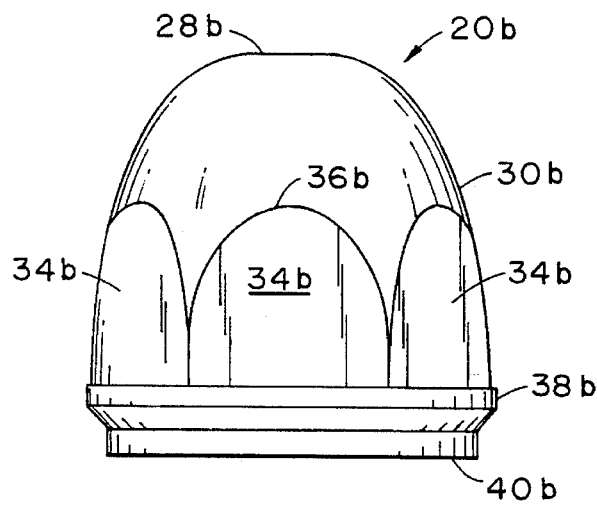
FIG. 6 is a side view of a second alternative embodiment of the invention.

A second alternative embodiment of the invention, cover 20b, illustrated in FIG. 6, is also quite similar to cover 20, except that it also lacks the detents mentioned above. The primary difference between cover 20b and cover 20a is in its outward appearance and profile. As shown in FIG. 6, cover 20b is comprised of closed top end portion 28b and generally cylindrical sidewall 30b extending downwardly therefrom so as to define a generally hollow cavity (not shown) within the cover. Preferably, sidewall 30b includes a plurality of exterior planar surfaces 34b, which cooperate with end portion 28b to form a plurality of arches 36b. Depending from the bottom of and around the periphery of sidewall 30b is terminal collar 38b, which is adapted to seat on at least a portion of a flange in a hub cap, as described in co-pending application Ser. No. 08/401,731, when the cover is used in the wheel cover assembly of the aforementioned application. In a preferred embodiment of this invention, annular base 40b extends downwardly from sidewall 30b below collar 38b so that at least a portion thereof will be seated near or substantially flush against a relatively flat surface of a wheel or other surface through which the bolt protrudes when the cover is installed over a bolt and nut.

Figure 7:
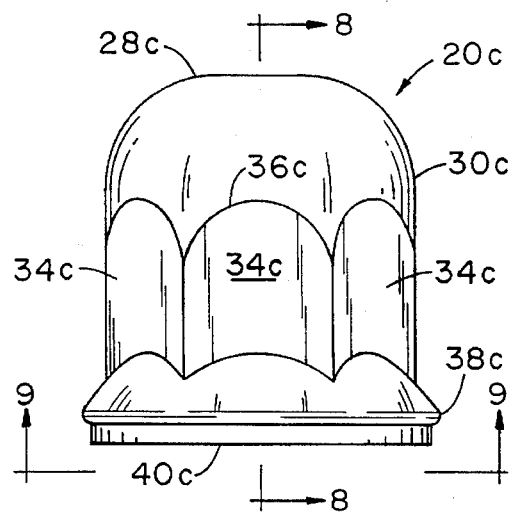
FIG. 7 is a side view of a third alternative embodiment of the invention.
Figure 8:
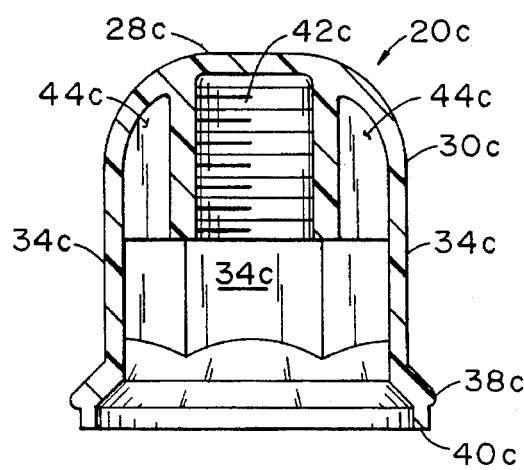
FIG. 8 is a sectional view of the cover of FIG. 7, taken along lines 8—8.
Figure 9:
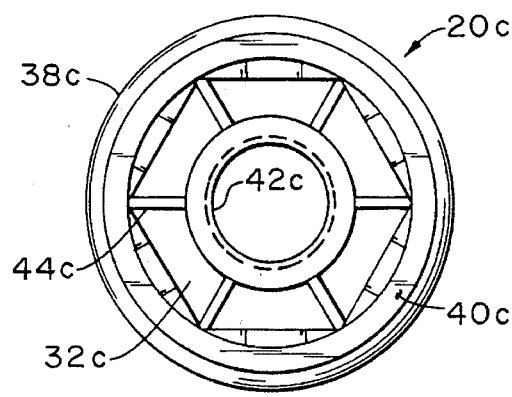
FIG. 9 is a bottom view of the cover of FIG. 7 taken along lines 9—9.

A third alternative embodiment of the invention, cover 20c, is illustrated in FIGS. 7 through 9. The primary difference between cover 20c and covers 20a and 20b is in its outward appearance and profile. As shown in FIGS. 7 through 9, cover 20c is comprised of a closed top end portion 28c and a generally cylindrical sidewall 30c extending downwardly therefrom so as to define a generally hollow cavity 32c within the cover. Preferably, sidewall 30c includes a plurality of exterior planar surfaces 34c, which cooperate with end portion 28c to form a plurality of arches 36c. Depending from the bottom of and around the periphery of sidewall 30c is terminal collar 38c, which is adapted to seat on at least a portion of a flange in a hub cap, as described in co-pending application Ser. No. 08/401,731, when the cover is used in the wheel cover assembly of the aforementioned application. Preferably, annular base 40c extends downwardly from sidewall 30c below collar 38c so that at least a portion thereof will be seated near or substantially flush against a relatively flat surface of a wheel or other structure when the cover is installed over a bolt (and its associated nut) that protrudes therethrough. Although not so illustrated in FIGS. 7 through 9, base 40c could alternatively be configured to be substantially coplanar with the lower side of collar 38c.

Cover 20c is configured for attachment by threaded engagement to the portion of a bolt that extends through its associated nut. As shown in FIG. 8, cover 20c is provided with an internally threaded portion 42c, which extends inwardly from an inner surface of top end portion 28c and is adapted to mate with the external threads on a bolt. When cover 20c is installed over a bolt and nut, it will preferably substantially cover the bolt and nut and minimize any exposure of the hole in the wheel or other surface through which the bolt passes. Furthermore, cover 20c is sized to fit over the bolt and nut with sufficient space or clearance to rotate thereabout as it is threaded onto the bolt.

Cover 20c may be easily installed by hand over a bolt and nut without the use of tools. It may also be hand tightened, or it may be tightened with a wrench, so that at least a portion of base 40c seats near or substantially flush against a relatively flat surface of a wheel or other surface through which the bolt protrudes. In forming cover 20c, it is preferable to provide a plurality of internal stiffening ribs 44c for added strength and stability. As shown in FIG. 9, cover 20c preferably includes six such ribs 44c, or one at each intersection of adjacent planar surfaces 34c (FIG. 7).

Figure 10:
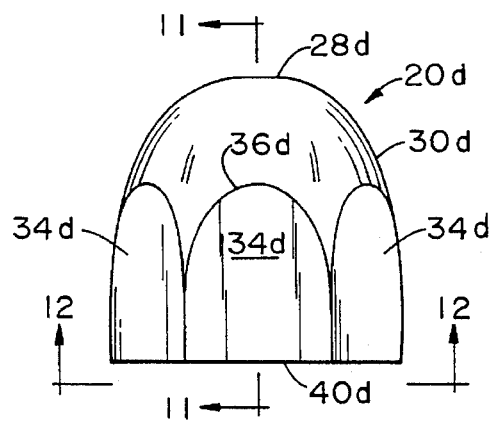
FIG. 10 is a side view of a fourth alternative embodiment of the invention.
Figure 11:
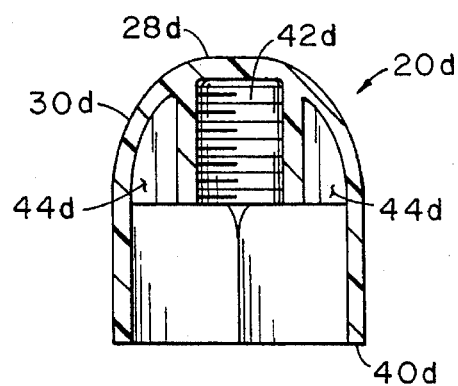
FIG. 11 is a sectional view of the cover of FIG. 10, taken along lines 11—11.
Figure 12:
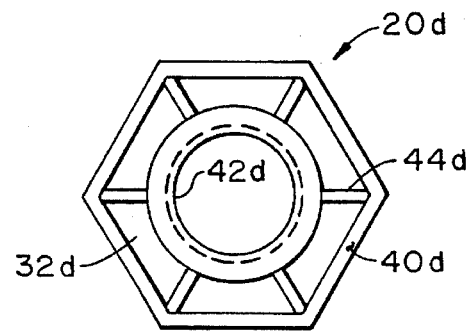
FIG. 12 is a bottom view of the cover of FIG. 10, taken along lines 12—12.

FIGS. 10 through 12 illustrate a fourth alternative embodiment of the invention, the exterior appearance of which resembles the cover of U.S. Pat. No. 5,082,409 of Bias. As shown therein, cover 20d is comprised of a closed top end portion 28d and a generally cylindrical sidewall 30d extending downwardly therefrom so as to define a generally hollow cavity 32d within the cover. Preferably, sidewall 30d includes a plurality of exterior planar surfaces 34d, which cooperate with end portion 28d to form a plurality of arches 36d. At the bottom of sidewall 30d is sidewall base 40d, at least a portion of which will be seated near or substantially flush against a relatively flat surface of a wheel or other structure when the cover is installed over a bolt (and its associated nut) that protrudes therethrough.

Cover 20d is configured for attachment by threaded engagement to the portion of a bolt that extends through its associated nut. As shown in FIG. 11, cover 20d is provided with an internally threaded portion 42d, which extends inwardly from an inner surface of top end portion 28d and is adapted to mate with the external threads on a bolt. When cover 20d is installed over a bolt and nut, it will preferably substantially cover the bolt and nut and minimize any exposure of the hole in the wheel or other surface through which the bolt passes. Furthermore, cover 20d is sized to fit over the bolt and nut with sufficient space or clearance to rotate thereabout as it is threaded onto the bolt.

Cover 20d may be easily installed by hand over a bolt and nut without the use at each intersection of adjacent planar surfaces 34d (FIG. 10).

Although this description contains many specifics, these should not be construed as limiting the scope of the invention but as merely providing plurality of internal stiffening ribs 44d for added strength and stability. As shown in FIG. 12, cover 20d preferably includes six such ribs 44d, or one at each intersection of adjacent planar surfaces 34d (FIG. 10).

Although this description contains many specifics, these should not be construed as limiting the scope of the invention but as merely providing illustrations of some of the presently preferred embodiments of this invention. Thus, the invention, as described herein, is susceptible to various modifications and adaptations, and the same are intended to be comprehended within the meaning and range of equivalents of the appended claims.

What is claimed is:

1. A one-piece, reusable cover for an assembly of a threaded bolt and an associated annular nut, wherein a portion of the bolt extends through the nut, said cover comprising:

(a) a closed top end portion; and (b) a generally cylindrical sidewall extending from the closed top end portion so as to define a generally hollow cavity within the cover, wherein the exterior of the sidewall includes a plurality of adjacent planar surfaces and (c) an internally threaded portion which extends into the cavity of the cover from an interior surface of the top end portion, which internally threaded portion is supported by a plurality of stiffening ribs extending inwardly from one or more inner surfaces of the sidewall, wherein a stiffening rib is provided at each intersection of adjacent planar surfaces; wherein the threads of the internally threaded portion are adapted to mate with external threads on the bolt, so that the cover may be attached to the portion of the bolt that extends through its associated nut by threaded engagement therewith, when the cover is installed over the bolt and nut assembly.

2. The cover of claim 1, wherein the closed top end portion is generally dome-shaped.

3. The cover of claim 1, wherein the sidewall extends from the top end portion a greater distance than does the internally threaded portion from an interior surface of the top end portion, so that when the cover is installed over the bolt and nut assembly, the sidewall encloses at least a portion of the nut.

4. The cover of claim 3, wherein the sidewall is of sufficient dimension so as to fully enclose the bolt and nut assembly when the cover is threaded onto the portion of the bolt that extends through the nut.

5. The cover of claim 3, wherein the end of the internally threaded portion located away from the top end portion abuts a surface of the nut when the cover is installed over the bolt and nut assembly.

6. The cover of claim 1, wherein the sidewall includes six planar surfaces in a generally hexagonal arrangement.

7. The cover of claim 1, which is molded from a rigid plastic material.

8. The cover of claim 7, the exterior surface of which is chrome-plated.

9. A one-piece, removable cover for an assembly of a bolt and an associated annular nut, wherein a portion of the bolt extends through the nut, and wherein a plurality of said bolt and nut assemblies are used to mount a wheel to a vehicle, said cover comprising:

(a) a closed top end portion; and (b) a generally cylindrical sidewall extending from the closed top end portion so as to define a generally hollow cavity within the cover, wherein the exterior of the sidewall includes a plurality of adjacent planar surfaces and (c) an internally threaded portion which extends into the cavity of the cover from an interior surface of the top end portion, which internally threaded portion is supported by a plurality of stiffening ribs extending inwardly from one or more inner surfaces of the sidewall, wherein a stiffening rib is provided at each intersection of adjacent planar surfaces;

wherein the threads of the internally threaded portion are adapted to mate with external threads on the bolt, so that the cover may be attached to the portion of the bolt that extends through its associated nut by threaded engagement therewith; and wherein the sidewall is of sufficient dimension so as to enclose substantially all of the bolt and nut assembly when the cover is threaded onto the portion of the bolt that extends through the nut.

10. The cover of claim 9, wherein the sidewall terminates in a base adapted for abutting the wheel.

11. The cover of claim 9, wherein the sidewall terminates in a base adapted for abutting a wheel cover.

12. The cover of claim 9, wherein the closed top end portion is generally dome-shaped.

13. The cover of claim 9, wherein the end of the internally threaded portion located away from the top end portion abuts a surface of the nut when the cover is installed over the bolt and nut assembly.

14. The cover of claim 9, wherein the sidewall includes six planar surfaces in a generally hexagonal arrangement.

15. The cover of claim 9, which is molded from a rigid plastic material.

16. The cover of claim 9, the exterior surface of which is chrome-plated.

* * * * *